United States Patent [19]

Baumann et al.

[11] Patent Number: 4,489,002
[45] Date of Patent: Dec. 18, 1984

[54] AZO COMPOUND AND AN AZOMETHINE COMPOUND AND HAVING A TERTIARY N-DATIVE BOND

[75] Inventors: Hans Baumann, Wachenheim; Klaus Grychtol, Bad Durkheim, both of Fed. Rep. of Germany

[73] Assignee: BASF Aktiengesellschaft, Ludwigshafen, Fed. Rep. of Germany

[21] Appl. No.: 384,945

[22] Filed: Jun. 4, 1982

[30] Foreign Application Priority Data

Jun. 19, 1981 [DE] Fed. Rep. of Germany ....... 3123969

[51] Int. Cl.³ .............. C09B 45/02; C09B 45/06; C09B 45/16; C09B 45/48
[52] U.S. Cl. .............. 534/695; 260/239 B; 260/239 BF; 544/4; 544/64; 544/225; 549/403; 564/276; 546/5; 546/6; 548/375
[58] Field of Search .......... 260/145 A, 145 B, 147, 260/148, 149, 150, 151, 146 R, 146 D, 146 T

[56] References Cited

U.S. PATENT DOCUMENTS 4,212,801 7/1980 Baumann ................ 260/145 A
4,264,494 4/1981 Grychtol et al. ........... 260/146 R

FOREIGN PATENT DOCUMENTS 1572473 7/1980 United Kingdom ........... 260/147

OTHER PUBLICATIONS

Lubs, H. A., "The Chemistry of Synthetic Dyes and Pigments", Krieger, Huntington, N.Y., (1972).
Zollinger, H. in "Azo and Diazo Chemistry–Sliphatic and Aromatic Compounds", Interscience, N.Y., (1961).
Schetty, G., in "The Irgalan Dyes Neutral Dying Metal Complex Dyes", J. Soc. Dyers., col. 71, 705, (1955).
Griffiths, J. in "Colour and Constitution of Organic Molecules", Academic Press, N.Y., (1976).

Primary Examiner—Floyd D. Higel
Attorney, Agent, or Firm—Oblon, Fisher, Spivak, McClelland & Maier

[57] ABSTRACT

Compounds of the general formula I

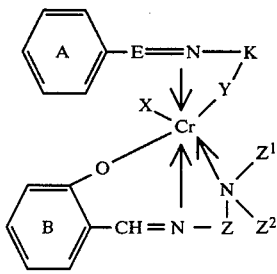

where E is —CH= or —N=, K is the radical of an amine or of a coupling component of the benzene, naphthalene, pyrazole, pyridine, pyrimidine, quinoline or isoquinoline series, or the radical of a 1,3-dicarbonyl compound which can be coupled, X is —O— or —COO—, Y is —O—, —COO— or —NH—, $Z^1$ and $Z^2$ independently of one another are unsubstituted or substituted alkyl or cycloalkyl, and one of them may furthermore be unsubstituted or substituted aryl, or $Z^1$ and $Z^2$ together with the nitrogen atom are a heterocyclic radical, and Z is unsubstituted or substituted $C_2$- or $C_3$-alkylene, from 1 to 4 sulfonic acid groups can be present and the rings A and B can be further substituted or can carry a fused benzene ring.

The compounds of the present invention are suitable for dyeing or printing natural or synthetic N-containing materials, i.e., wool, leather or polyamide or polyurethane fibers, as wells as for coloring inks. The colored salts with amine bases are insoluble in water, but soluble in organic solvent. These colored salts can be used for dyeing organic liquids, resins or surface coatings, wood stains, paste for ball point pens, for coloring anodized aluminum, or for spin-dyeing, i.e., cellulose ester fibers for polyamide fibers.

4 Claims, No Drawings

AZO COMPOUND AND AN AZOMETHINE COMPOUND AND HAVING A TERTIARY N-DATIVE BOND

BACKGROUND OF THE INVENTION

1. Field of the Invention

The present invention relates to asymmetric 1:2 neutral chromium complexes having a tertiary N-dative bond and possessing characteristics which are suitable for dyeing or printing natural or synthetic N-containing materials, such as wool, leather, polyamide or polyurethane fibers, and for coloring inks. In addition, the present invention relates to the colored salts of the present dyes with amine bases.

SUMMARY OF THE INVENTION

The present invention relates to compounds to the general formula I

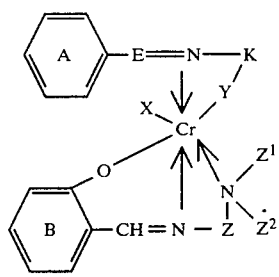

where E is —CH= or —N=, K is the radical of an amine or of a coupling component of the benzene, naphthalene, pyrazole, pyridine, pyrimidine, quinoline or isoquinoline series, or the radical of a 1,3-dicarbonyl compound which can be coupled, X is —O— or —COO—, Y is —O—, —COO— or —NH—, $Z^1$ and $Z^2$ independently of one another are unsubstituted or substituted alkyl or cycloalkyl, and one of them may furthermore be unsubstituted or substituted aryl, or $Z^1$ or $Z^2$ together with the nitrogen atom are a heterocyclic radical, and Z is unsubstituted or substituted $C_2$- or $C_3$-alkylene, from 1 to 4 sulfonic acid groups can be present and the rings A and B can be further substituted or can carry a fused benzene ring.

DETAILED DESCRIPTION OF THE PREFERRED EMBODIMENTS

The present invention relates to compounds of the general formula I

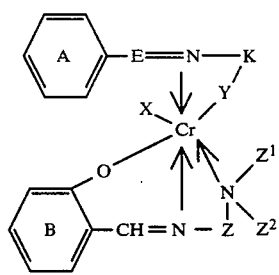

where E is —CH= or —N=, K is the radical of an amine or of a coupling component of the benzene, naphthalene, pyrazole, pyridine, pyrimidine, quinoline or isoquinoline series, or the radical of a 1,3-dicarbonyl compound which can be coupled, X is —O— or —COO—, Y is —O—, —COO— or —NH—, $Z^1$ and $Z^2$ independently of one another are unsubstituted or substituted alkyl or cycloalkyl, and one of them may furthermore be unsubstituted or substituted aryl, or $Z^1$ and $Z^2$ together with the nitrogen atom are a heterocyclic radical, and Z is unsubstituted or substituted $C_2$- or $C_3$-alkylene, from 1 to 4 sulfonic acid groups can be present and the rings A and B can be further substituted or can carry a fused benzene ring.

The present invention relates in particular to compounds of the general formula Ia

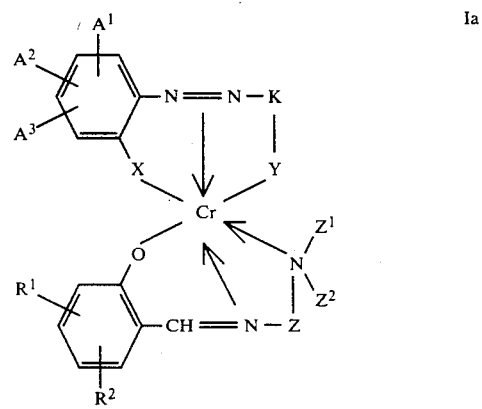

where $A^1$ is hydrogen, hydroxysulfonyl, chlorine, bromine, methyl, methoxy, ethoxy, nitro, methylsulfonyl, ethylsulfonyl, sulfamyl, N-mono- or N,N-di-$C_1$-$C_4$-alkyl-substituted sulfamyl or N-phenylsulfamyl, $A^2$ is hydrogen, chlorine, nitro or hydroxysulfonyl, $A^3$ is hydrogen, $A^1$ and $A^3$ together are an unsubstituted or nitro-substituted fused benzene ring, $R^1$ is hydrogen, chlorine, bromine, nitro, hydroxysulfonyl, phenylazo which is unsubstituted or substituted by chlorine, bromine, methyl, methoxy, ethoxy, nitro or hydroxysulfonyl, or naphthylazo which is substituted by hydroxysulfonyl, $R^2$ is hydrogen, chlorine, bromine or nitro, $R^1$ and $R^2$ together are a fused benzene ring, X is —O— or —COO—, Y is —O— or —NH—,

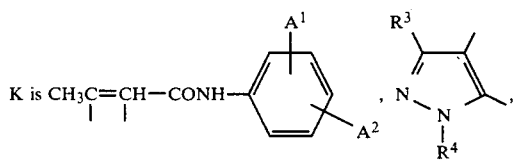

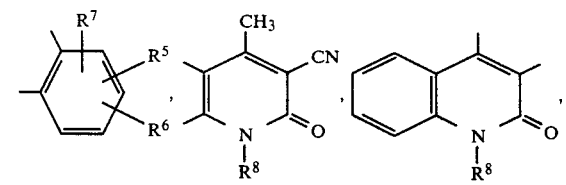

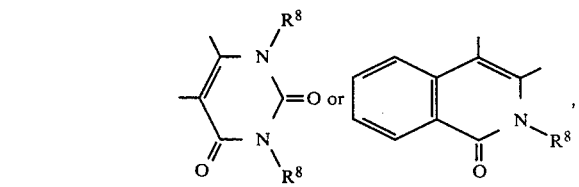

$R^3$ is hydrogen, methyl, phenyl, carboxyl or carbamyl, $R^4$ is hydrogen, or phenyl which is unsubstituted or substituted by methyl, chlorine or hydroxysulfonyl, $R^5$ is methyl, methoxy, acetylamino, propionylamino, benzoylamino, N-phenylamino, dimethylamino or diethylamino, $R^6$ is hydrogen or methyl, $R^7$ is hydrogen or, when $R^5$ and $R^6$ together are a fused benzene ring which is unsubstituted or substituted by bromine, amino, hydroxyl, phenylamino, acetylamino, propionylamino, benzoylamino or hydroxysulfonyl, is hydroxysulfonyl, $R^8$ is hydrogen, unsubstituted or substituted $C_1$–$C_{18}$-alkyl, benzyl or phenylethyl, $Z^1$ and $Z^2$ independently of one another are unsubstituted or substituted alkyl or cycloalkyl, and one of the radicals additionally may be unsubstituted or substituted aryl, or $Z^1$ and $Z^2$ together with the nitrogen atom are a heterocyclic radical, and Z is unsubstituted or substituted $C_2$–$C_3$-alkylene, and from one to four sulfonic acid groups can be present.

Examples of compounds of the formula

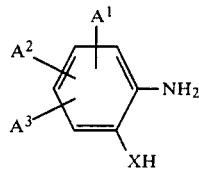

which are suitable as the diazo component or as the amine K are amines of the benzene or naphthalene series which have, as the complex-forming substituent, an alkoxy, hydroxyl or carboxyl group in the o-position to the amino group, specific examples of these compounds being 2-aminophenol, 4-chloro-2-aminophenol, 4- or 5-nitro-2-aminophenol, 4,6-dichloro-2-aminophenol, 4,6-dinitro-2-aminophenol, 4-methyl-6-nitro-2-aminophenol, 4-chloro-5-nitro-2-aminoanisole, 4,5-dichloro-2-aminoanisole, 2-aminobenzoic acid, 4-nitro-2-aminobenzoic acid, 2-aminophenol-4-sulfonic acid, 2-aminophenol-4-sulfonic acid amide, 2-aminophenol-4-sulfonic acid methylamide, 2-aminophenol-4-sulfonic acid phenylamide, 4-chloro-2-aminophenol-6-sulfonic acid, 4-chloro-2-aminoanisole-5-sulfonic acid methylamide, 4-nitro-2-aminophenol-6-sulfonic acid, 6-nitro-2-aminophenol-4-sulfonic acid, 5-nitro-2-aminoanisole-4-sulfonic acid, 1-aminonaphth-2-ol-4-sulfonic acid, 1-amino-6-nitronaphth-2-ol-4-sulfonic acid, 2-aminonaphth-1-ol-5-sulfonic acid, 2-amino-4-sulfobenzoic acid and 2-amino-5-sulfobenzoic acid.

Examples of compounds of the formula H—K—YH are coupling components of the benzene, naphthalene, pyrazole, pyridine, quinoline, isoquinoline and pyrimidine series which contain hydroxyl or amino groups, and derivatives of 1,3-dicarbonyl compounds, specific examples of these compounds being 4-methylphenol, 3,4-dimethylphenol, 4-acetylaminophenol, 4-methyl-3-acetylaminophenol, 3-diethylaminophenol, 4-methyl-3-ethylaminophenol, 3-(o-tolylamino)phenol, naphth-2-ylamine, naphth-2-ol, 6-bromonaphth-2-ol, 5,8-dichloronaphth-1-ol, naphth-1-ol-5-sulfonic acid, naphth-2-ol-6-sulfonic acid, naphth-1-ylamino-4- or -5-sulfonic acid, naphth-2-ylamino-5- or -6-sulfonic acid, 8-acetylaminonaphth-1-ol-5-sulfonic acid, 6-phenylaminonaphth-1-3-sulfonic acid, 7-aminonaphth-1-ol-3-sulfonic acid, 3-methylpyrazol-5-one, 1-phenyl-3-methylpyrazol-5-one, 1,3-diphenylpyrazol-5-one, 1-phenyl-3-carbethoxypyrazol-5-one, 1-(2'-methylphenyl)-3-methylpyrazol-5-one, 1-(4'-chlorophenyl)-3-methylpyrazol-5-one, 1-(2',5'-dichlorophenyl)-3-methylpyrazol-5-one, 1-phenyl-3-methylpyrazol-5-one-4'-carboxylic acid, 1-phenyl-3-methylpyrazol-5-one-3'- or -4'-sulfonic acid, 1,3-diphenylpyrazol-5-one-2'-sulfonic acid, 1-(2'chlorophenyl)-3-methylpyrazol-5-one-5'-sulfonic acid, 2,4-dihydroxyquinoline, acetoacetyl-N-cyclohexylamide, acetoacetyl-N-phenylamide, acetoacetyl-N-(2-chlorophenyl)-amide and acetoacetyl-N-(4-methyl-2-sulfophenyl)-amide.

Examples of compounds of the formula

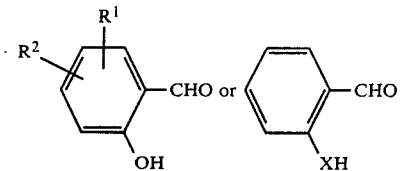

are o-hydroxyaldehydes of the benzene and naphthalene series, such as 2-hydroxybenzaldehyde, 2-hydroxy-1-naphthaldehyde, 3-nitro-2-hydroxybenzaldehyde, 5-nitro-2-hydroxybenzaldehyde, 5-bromo-2-hydroxybenzaldehyde, 3,5-dinitroor 3,5-dichloro-2-hydroxybenzaldehyde, 2-hydroxy-1-naphthaldehyde-3-carboxylic acid, 2-hydroxybenzaldehyde-5-sulfonic acid, 5-(2',5'-dichlorophenylazo)-2-hydroxybenzaldehyde, 5-(2',5'-dichlorophenylazo)-2-hydroxybenzaldehyde-4'-sulfonic acid, 5-(2'-methoxyphenylazo)-2-hydroxybenzaldehyde-5'-sulfonic acid or -sulfonic acid methylamide, 5-(2'-chlorophenylazo)-2-hydroxybenzaldehyde-5'-sulfonic acid, 5-phenylazo-2-hydroxybenzaldehyde-4'-sulfonic acid and 5-(naphthyl-2'-azo)-2-hydroxybenzaldehyde-6'-sulfonic acid.

Examples of alkyl radicals $R^8$ are n-hexyl, n-octyl, i-octyl, n-decyl, n-dodecyl, n- and i-tridecyl, palmityl, stearyl and, in particular, methyl, ethyl, n- and i-propyl, n- and i-butyl, and $C_2$- or $C_3$-alkylene which is substituted by hydroxyl or $C_1$–$C_4$-alkoxy.

Z is preferably

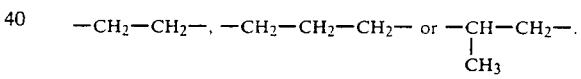

Examples of radicals $Z^1$ and $Z^2$ are $C_1$–$C_{20}$-alkyl, which can be further substituted by hydroxyl, $C_1$–$C_8$-alkoxy, phenoxy or unsubstituted or substituted aryl, or are cyclopentyl, cyclohexyl or methylcyclohexyl, or phenyl which is substituted by chlorine, bromine, methyl, ethyl, methoxy or ethoxy, or together with the nitrogen atom are pyrrolidino, piperidino, morpholino, methylmorpholino, dimethylmorpholino, N-methylpiperazino, N-(β-hydroxyethyl)-piperazino, thiomorpholino-2-dioxide or hexamethyleneimino. Specific examples of radicals of $Z^1$ and $Z^2$ in addition to those given above are

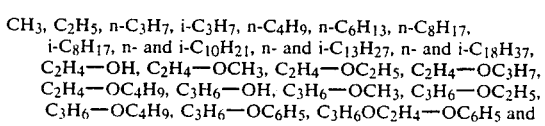

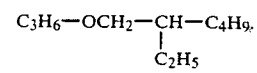

The preparation of the 1:2 chromium complex is carried out in stages, using the 1:1 chromium complex of the azo or azomethine compound, which can be obtained by conventional processes, as the starting material.

The reaction of the 1:1 chromium complex with the azomethine compound, or with its individual components, is carried out in aqueous solution or suspension or, if necessary, in an organic solvent, or with the addition of an organic solvent, for example an alcohol or a carboxylic acid amide. The 1:2 complex is formed in the slightly acid to alkaline range, preferably at pH 6-9, and at elevated temperatures, for example from 50° C. to the boiling point. The pH is regulated with an alkali metal hydroxide, and alkali metal salt of a weak acid, or an alkanolamine.

The resulting 1:2 complex is isolated by acidification, salting out with an alkali metal salt, or evaporating the solution down, and water-soluble complex salts are obtained. A water-insoluble, organophilic dye is prepared by precipitating the complex from aqueous solution with a suitable N-containing base which provides the cation.

The N-containing bases used for the preparation of these solvent dyes are relatively long-chain alkylamines or cycloalkylamines, preferably of 6-≠carbon atoms, eg. 2-ethylhexylamine, di-(2-ethylhexyl)-amine, 3-(2'-ethylhexoxy)-propylamine, dodecylamine, isotridecylamine, oleylamine, dicyclohexylamine, N,N'-diphenylguanidine, N,N'-di-(2-methylphenyl)-guanidine, phenylbiguanide, 4-chlorophenylbiguanide or (2-methylphenyl)-biguanide.

The dyes are suitable for dyeing or printing natural or synthetic nitrogen-containing materials, such as wool, leather, or polyamide or polyurethane fibers, and for coloring inks.

The colored salts with amine bases are insoluble in water but soluble in organic solvents, and can be used for dyeing organic liquids, resins or surface coatings, wood stains, or pastes for ballpoint pens, for coloring anodized aluminum, or for spin-dyeing, for example, cellulose ester fibers or polyamide fibers.

Of particular industrial importance are dyes of the formula Ib

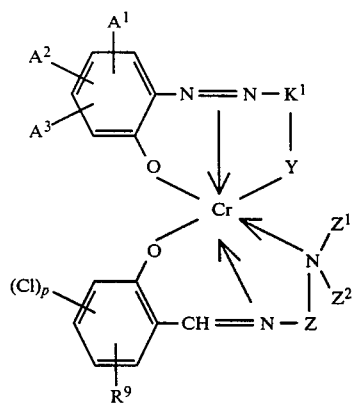

where p is 0, 1 or 2, $R^9$ is hydrogen or, where p=0, is phenylazo which is unsubstituted or substituted by chlorine, methyl, methoxy or hydroxysulfonyl, $K^1$ is a radical of the formula

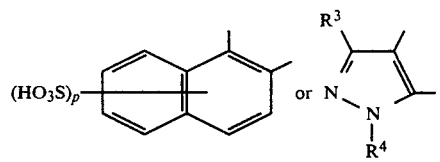

$A^1$, $A^2$, $A^3$, Y, Z, $Z^1$, $Z^2$, $R^3$ and $R^4$ have the above meanings, $R^3$ is preferably methyl or carboxyl, and $R^4$ is phenyl which is unsubstituted or substituted by methyl, chlorine and/or hydroxysulfonyl.

Preferably, $A^1$ is hydroxysulfonyl, chlorine or nitro, $A^2$ is hydrogen, chlorine, nitro or hydroxysulfonyl, $A^1$ and $A^3$ together are an unsubstituted or nitro-substituted fused benzene ring, Z is —CH$_2$—CH$_2$— or —CH$_2$—CH$_2$—CH$_2$—, and $Z^1$ and $Z^2$ independently of one another are C$_1$-C$_4$-alkyl, β-hydroxyethyl or -propyl, or C$_1$-C$_4$-alkoxyethyl or -propyl, or together with the nitrogen atom are the above heterocyclic radicals.

Further important compounds are those of the general formula Ic

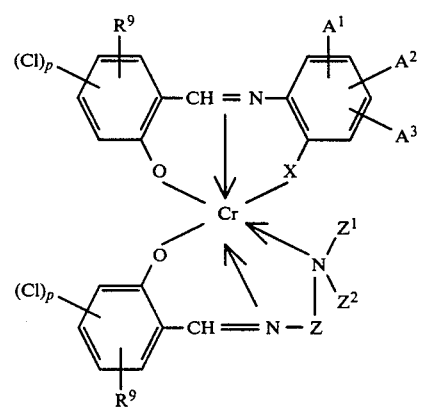

where $A^1$, $A^2$, $A^3$, P, $R^9$, X, Z, $Z^1$ and $Z^2$ have the meanings given for formula Ib.

In the Examples which follow, parts and percentages are by weight, unless stated otherwise.

Having generally described the invention, a more complete understanding can be obtained by reference to certain specific examples, which are provided herein for purposes of illustration only, and are not intended to be limiting unless otherwise specified.

EXAMPLES

EXAMPLE 1

12.2 parts of 2-hydroxybenzaldehyde are added dropwise to a solution of 11.0 parts of 1-(β-aminoethyl)-pyrrolidine and 12.0 parts of acetic acid in 100 parts of water, while stirring, and stirring is continued at 50° C. until the aldehyde has dissolved and a yellow solution of the azomethine has formed. The solution is diluted with a further 100 ml of water at 70° C., and 61 parts (0.1 mole) of the 1:1 chromium complex of the coupling product of diazotized 1-amino-2-hydroxynaphthalene-4-sulfonic acid and 1-hydroxynaphthalene-8-sulfonic acid (CI Acid Blue 158) are introduced, while stirring. The pH is kept at 7.2-7.5 with dilute sodium hydroxide solution, while stirring is continued at 70° C., and about 13 parts of NaOH are consumed before completion of the 1:2 complex formation, which can be monitored by thin layer chromatography.

The resulting complex of the formula

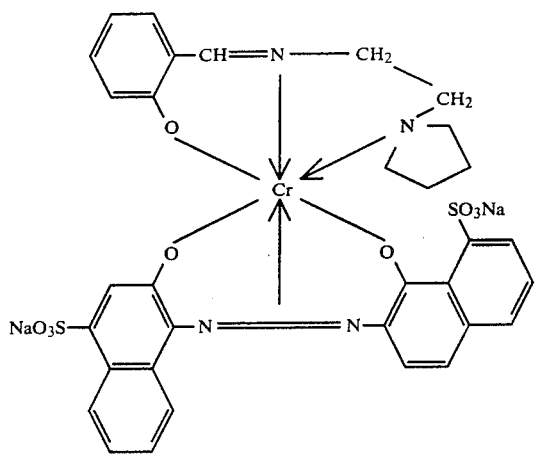

is precipitated with 120 parts of sodium chloride, filtered off under suction at room temperature and dried at 80° C. to give 82 parts of a dye powder which contains sodium chloride and which dissolves in water to give a deep blue solution.

Lightfast and wetfast clear blue dyeings are obtained on wool and synthetic polyamide fibers.

The complex dyes listed in the table below are obtained in a corresponding manner:

| Example | 1:1 chromium complex of | Azomethine obtained from | Color on wool or nylon |
|---|---|---|---|
| 2 | ![structure] HO$_3$S—[naphthalene with OH, HO, SO$_3$H]—N=N—[naphthalene] | Cl—[benzene with Cl, OH]—CH=O + NH$_2$*—C$_2$H$_4$—N(C$_2$H$_5$)$_2$ | blue |
| 3 | HO$_3$S—[naphthalene with OH, HO, SO$_3$H]—N=N—[naphthalene] | [naphthalene with OH]—CH=O + NH$_2$—C$_3$H$_6$—N(CH$_3$)$_2$ | dark blue |
| 4 | HO$_3$S—[naphthalene with OH, O$_2$N]—N=N—[naphthalene with OH] | O[morpholine]N—[benzene with OH]—CHO + NH$_2$—C$_2$H$_4$—N[pyrrolidine] | bluish-gray |
| 5 | HO$_3$S—[naphthalene with OH]—N=N—[naphthalene with OH] | [benzene]—CH=O + NH$_2$—C$_2$H$_4$—N[morpholine]O; OH | dark blue |
| 6 | O$_2$N—[benzene with OH]—N=N—[naphthalene with H$_2$N, SO$_3$H] | [benzene with OH]—CH=O + NH$_2$—C$_2$H$_4$—N[morpholine]O | bluish-green |
| 7 | HO$_3$S—[benzene with OH, O$_2$N]—N=N—[naphthalene with H$_2$N, SO$_3$H] | [benzene with OH]—CH=O + NH$_2$—C$_2$H$_4$—N[pyrrolidine] | olive green |

| Example | 1:1 chromium complex of | Azomethine obtained from | Color on wool or nylon |
|---|---|---|---|
| 8 | [structure: naphthalene with OH, HO3S, N=N, linked to C(OH)=C(CH3)-N=N-C6H4-SO3H] | [salicylaldehyde] CH=O (with OH) + NH2—C2H4—N(morpholine) | bluish-red |
| 9 | [structure: naphthalene with OH, HO3S, N=N, linked to C(OH)=C(CH3)-N=N-C6H5] | CH=O (with OH) + NH2—C2H4—N(morpholine) | bluish-red |
| 10 | [structure: HO3S-naphthalene(OH)-N=N-naphthalene(OH) with O2N substituent] | CH=O (with OH) + NH2—C2H4—N(morpholine) | bluish-gray |
| 11 | [structure: HO3S, OH, O2N-phenyl-N=N-naphthalene-OH] | CH=O (with OH) + NH2—C2H4—N(morpholine) | violet |
| 12 | [structure: HO3S, OH, Cl-phenyl-N=N-C(OH)=C(CH3)-N=N-C6H4-SO3H] | CH=O (with OH) + NH2—C2H4—N(morpholine) | orange red |
| 13 | [structure: HO3S, OH, O2N-phenyl-N=N-C(OH)=C(CH3)-N(N-C6H5)] | CH=O (with OH) + NH2—C2H4—N(morpholine) | orange |
| 14 | [structure: HO3S, OH, O2N-phenyl-N=N-C(=C(OH)CH3)-C(=O)NH-C6H4-OCH3] | CH=O (with OH) + NH2—C2H4—N(morpholine) | yellow |
| 15 | [structure: CO2H-phenyl-N=N-C(OH)=C(CH3)-N=N-C6H4-SO3H] | CH=O (with OH) + NH2—C2H4—N(morpholine) | yellow |
| 16 | [structure: OCH3, Cl, OCH3-phenyl-N=N-naphthalene(OH)(HO3S)(SO3H)] | CH=O (with OH) + NH2—C2H4—N(morpholine) | blue |

| Example | 1:1 chromium complex of | Azomethine obtained from | Color on wool or nylon |
|---|---|---|---|
| 17 | (structure with HO₃S, OH, O₂N-naphthalene-N=N-C(=N-C₆H₄-SO₃H)-C(CH₃)=N) | 3,5-dichloro-2-hydroxybenzaldehyde + NH₂—C₂H₄—N(morpholine) | red |

EXAMPLE 18

15.3 parts of 5-phenylazo-2-hydroxybenzaldehyde-4'-sulfonic acid and 4.4 parts of N,N-dimethylethylenediamine are stirred in 70 parts of dimethylformamide at 50° C., a solution of 16.5 parts of sodium acetate in 100 parts of water is added, and 0.5 mole of the CI Acid Blue 158 used in Example 1 is introduced at 70° C., while stirring. The reaction mixture is kept neutral continuously with dilute sodium hydroxide solution.

After complex formation is complete, the dye is precipitated by the addition of 300 parts of a 25% strength sodium chloride solution. A complex of the formula

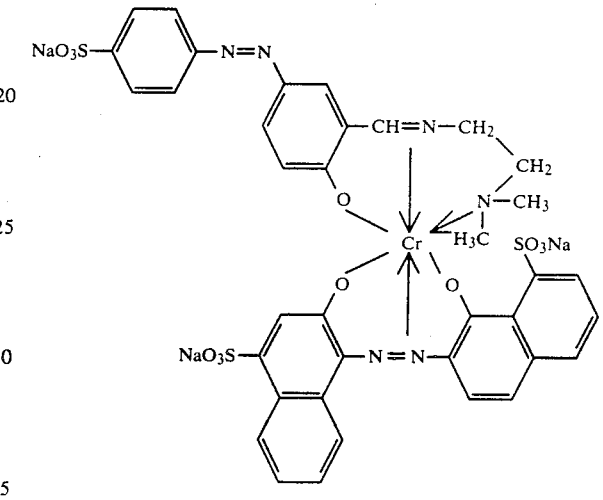

which gives lightfast and washfast dark green dyeings on wool and polyamide fibers is obtained.

The dyes listed in the table below are prepared by the same process:

| Example | | Color on wool, nylon or leather |
|---|---|---|
| 19 | 1:1 chromium complex of (NO₂, OH)-C₆H₃-N=N-(naphthalene with H₂N, SO₃H) + (naphthalene with SO₃H, HO₃S)-N=N-C₆H₃(OH)(CH=N—CH₂—CH₂—N(CH₃)₂) | yellowish green |

-continued
| Example | | Color on wool, nylon or leather |
|---|---|---|
| 20 | 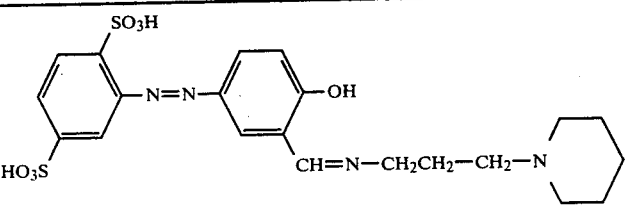 | yellowish green |
| | 1:1 chromium complex of <br> 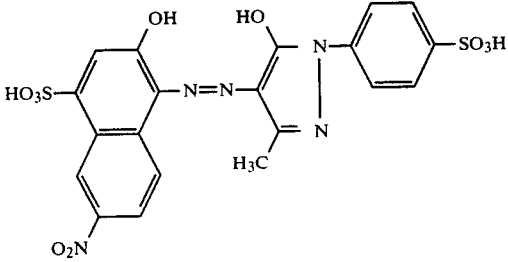 + | |
| 21 | 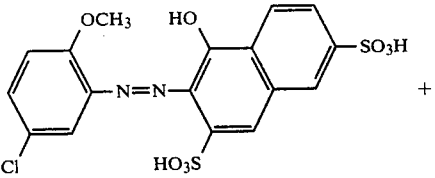 | red |
| | 1:1 chromium complex of <br> [structure] + | |
| 22 | [structure] + | brown |
| 23 | [structure] + | brown |
| 24 | [structure] | green |

| Example | | Color on wool, nylon or leather |
|---|---|---|
| | 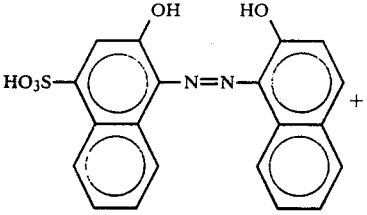 | |
| 25 | 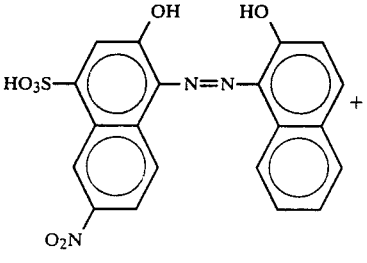 | olive |
| 26 | 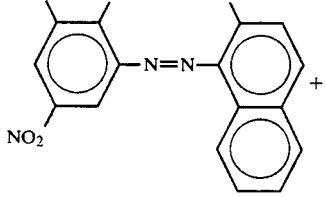 | brown |
| 27 | 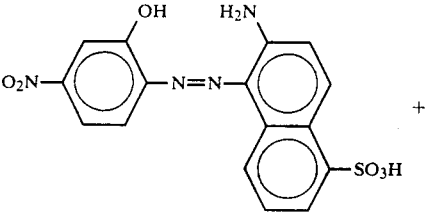 | green |
| 28 | 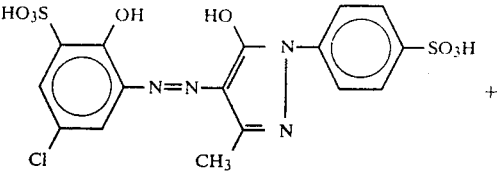 | orange red |
| 29 | 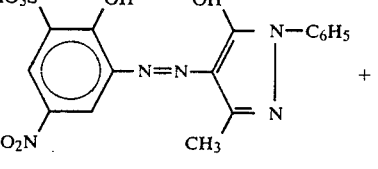 | orange |
| 30 | 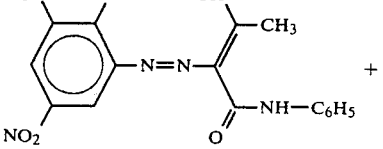 | yellow |

-continued

| Example | | Color on wool, nylon or leather |
|---|---|---|
| 31 | [structure: 2-carboxyphenyl-N=N- pyrazolone with CH3, OH, linked to -N-N- phenyl-SO3H] + | yellow |
| 32 | [structure: hydroxy-sulfo-naphthyl-N=N- pyrazolone with CH3, OH, linked to -N-N- phenyl-SO3H] + | red |
| | 1:1 chromium complex of [structure: 2-chloro-5-sulfophenyl-N=N-(2-hydroxy-phenyl)-CH=N-C2H4-N(morpholine)] + | |
| 33 | [structure: sulfo-hydroxynaphthyl-N=N-hydroxynaphthyl] + | green |
| 34 | [structure: sulfo-hydroxynaphthyl-N=N-hydroxynaphthyl with O2N substituent] + | grayish green |
| 35 | [structure: HO3S, OH, hydroxynaphthyl-N=N-hydroxynaphthyl with O2N substituent] + | violet brown |

| Example | | Color on wool, nylon or leather |
|---|---|---|
| 36 | | green |
| 37 | | red |
| 38 | | orange |
| 39 | | yellow |
| 40 | | yellow |
| 41 | | red |
1:1 chromium complex of
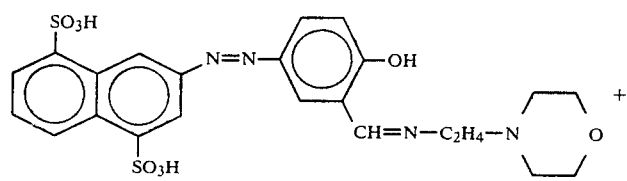

-continued
| Example | | Color on wool, nylon or leather |
|---|---|---|
| 42 | 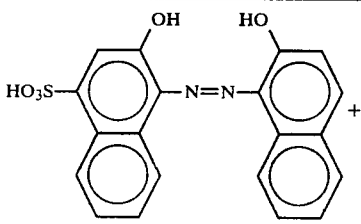 | green |
| 43 | 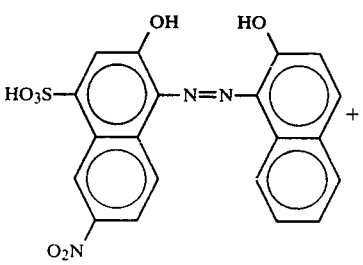 | olive-green |
| 44 | 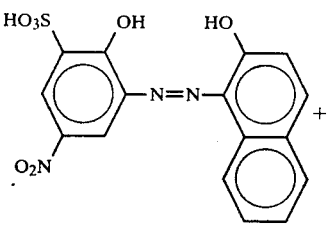 | brown |
| 45 | 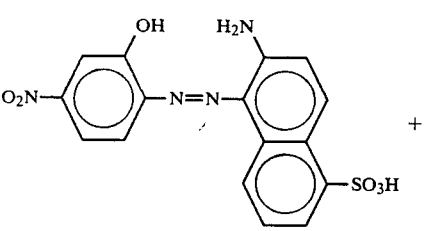 | green |
| 46 | 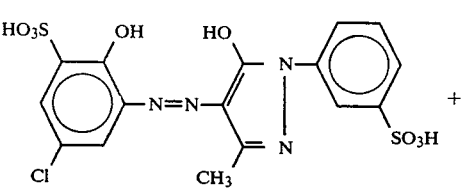 | orange |
| 47 | 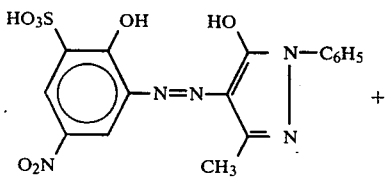 | yellowish orange |
| 48 | 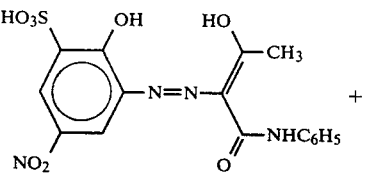 | yellow |

| Example | Structure | Color on wool, nylon or leather |
|---|---|---|
| 49 | (2-carboxyphenyl)-N=N-C(OH)=C(CH₃)-N(=N-)-NH-(3-sulfophenyl) + | yellow |
| 50 | (3-HO₃S, 2-OH-naphthyl)-N=N-C(OH)=C(CH₃)-N(=N-)-N(C₆H₅) | red |
| 51 | Chromium complex: [2-Cl, 4-NaO₃S-phenyl-N=N-phenyl(CH=N-C₂H₄-morpholine)(O→Cr)] and [3-NaO₃S, 5-NO₂-phenyl-N=N-CH-phenyl-(O→Cr)(O→Cr)] | — |

17 parts of 5-phenylazo-2-hydroxybenzaldehyde-2'-chloro-5'-sulfonic acid are stirred in 150 parts of water, 7 parts of β-aminoethylmorpholine are added, and the pH is brought to 7 with sodium acetate and glacial acetic acid. The mixture is stirred for half an hour at 50° C., and then heated to 70° C. Thereafter, 0.05 mole of the 1:1 chromium complex of 4-nitro-2-aminophenol-6-sulphonic acid and salicylaldehyde is added, and the pH is kept at 7.5 with dilute sodium hydroxide solution.

After the completion of the reaction has been detected by chromatographic analysis, the mixture is cooled, and the product is precipitated with sodium chloride, filtered off under suction, and dried at 70° C.

The readily water-soluble yellow dye gives fast dyeings on wool, polyamide and leather.

The dyes listed below are obtained in a corresponding manner.

| Example | 1:1 chromium complex of | Azomethine | Hue on wool, nylon or leather |
|---|---|---|---|
| 52 | 4-HO₃S, 2-OH, 5-O₂N-phenyl-N=CH-(2-HO-phenyl) | (2-HO-phenyl)-CH=N-C₂H₄-morpholine | yellow |
| 53 | 4-HO₃S, 2-OH, 5-O₂N-phenyl-N=CH-(2-HO, 5-NO₂-phenyl) | " | yellow |

-continued

| Example | 1:1 chromium complex of | Azomethine | Hue on wool, nylon or leather |
|---|---|---|---|
| 54 | 3-sulfo-5-chloro-2-hydroxyphenyl-N=CH-(2-hydroxyphenyl) | " | yellow |
| 55 | 3-sulfo-5-nitro-2-hydroxyphenyl-N=CH-(2-hydroxyphenyl) | 3,5-dichloro-4-sulfophenyl-N=N-[phenyl(CH=N-C₂H₄-morpholino)(OH)] | yellow |
| 56 | 3-sulfo-5-nitro-2-hydroxyphenyl-N=CH-(2-hydroxy-3-nitrophenyl) | " | yellow |
| 57 | 3-sulfo-5-chloro-2-hydroxyphenyl-N=CH-(2-hydroxyphenyl) | 2,5-dichloro-4-sulfophenyl-N=N-[phenyl(CH=N-C₂H₄-morpholino)(OH)] | yellow |
| 58 | " | 2-chloro-5-sulfophenyl-N=N-[phenyl(CH=N-C₂H₄-morpholino)(OH)] | yellow |
| 59 | 3-sulfo-5-nitro-2-hydroxyphenyl-N=CH-(2-hydroxyphenyl) | " | yellow |
| 60 | " | 1,4-disulfonaphth-7-yl-N=N-[phenyl(CH=N-C₂H₄-morpholino)(OH)] | yellow |

| Example | 1:1 chromium complex of | Azomethine | Hue on wool, nylon or leather |
|---|---|---|---|
| 61 | 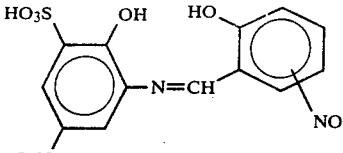 | " | yellow |
| 62 | 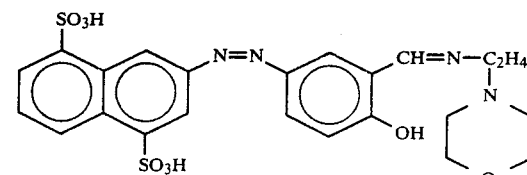 |  | yellow |

Dyes with similar fastness characteristics are obtained when β-aminoethylmorpholine is replaced by β-aminoethylpyrrolidine, β-aminoethylpiperazine, N,N-diethylethylenediamine, N,N-dimethylethylenediamine or γ-aminopropylmorpholine.

Having now fully described the invention, it will apparent to one of ordinary skill in the art that many changes and modifications can be made thereto without departing from the spirit or scope of the invention, as set forth therein.

What is claimed as new and desired to be secured by Letters Patent of the United States is:

1. An asymmetrical 1:2 chromium complex of the formula

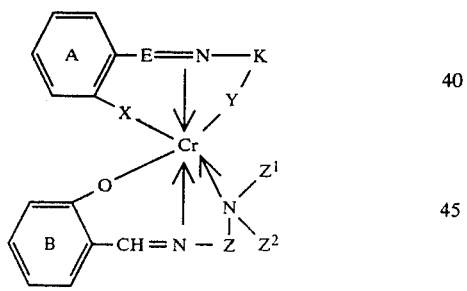

wherein:
 E is —CH+ of —N=,
 K is the radical of a benzene, naphthalene, pyrazole, pyridine, pyrimidine, quinoline or isoquinoline, which is unsubstituted or substituted at the ortho position with a complex forming residue selected from an alkoxy, hydroxyl or carboxyl group,
 X is —O— or —COO—,
 Y is —O—, —COO— or —NH—,
 $Z^1$ and $Z^2$ independently of one another are $C_1$–$C_{20}$ alkyl which is unsubstituted or substituted with hydroxyl, $C_1$–$C_8$-alkoxy or phenoxy, $C_5$–$C_7$ cycloalkyl or phenyl which is unsubstituted or substituted with chlorine, bromine, methyl, ethyl, methoxy, ethoxy, pyrrolidino, piperidino, morpholino, methyl-morpholino, dimethylmorpholino, N-methylpiperazino, N-(β-hydroxyethyl)-piperazino, thiomorpholino-2-dioxide or hexamethyleneimino, or $Z^1$ and $Z^2$ together form a N-containing heterocyclic radical, and
 Z is $C_2$–$C_3$ alkylene;
 wherein rings A, B or K have from 1 to 4 sulfonic acid groups, and rings A and B are a phenyl or naphthyl which, independently of each other are unsubstituted or substituted with hydrogen, hydroxysulfonyl, chlorine, bromine, methyl, methoxy, ethoxy, nitro, methylsulfonyl, ethyl-sulfonyl, sulfamyl, N-mono- or N,N-di-$C_1$-$C_4$-alkyl-substituted sulfamyl or N-phenylsulfamyl, hydroxysulfonyl, or phenylazo which is unsubstituted or substituted by chlorine, methyl, methoxy or hydroxysulfonyl.

2. The compound of claim 1, of the formula

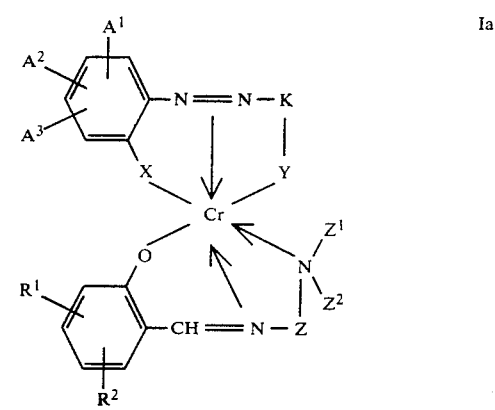

Ia wherein:
 $A^1$ is hydrogen, hydroxysulfonyl, chlorine, bromine, methyl, methoxy, ethoxy, nitro, methylsulfonyl, ethylsulfonyl, sulfamyl, N-mono- or N,N-di-$C_1$-$C_4$-alkyl-substituted sulfamyl or N-phenylsulfamyl,
 $A^2$ is hydrogen, chlorine, nitro or hydroxysulfonyl,
 $A^3$ is hydrogen,
 $A^1$ and $A^3$ together are an unsubstituted or nitrosubstituted fused benzene ring,
 $R^1$ is hydrogen, chlorine, bromine, nitro, hydroxysulfonyl, phenylazo which is unsubstituted or substituted by chlorine, bromine, methyl, methoxy, ethoxy, nitro or hydroxysulfonyl, or naphthylazo which is substituted by hydroxysulfonyl, $R^2$ is hydrogen, chlorine, bromine or nitro, $R^1$ and $R^2$ together are a fused benzene ring, X is —O— or —COO—, Y is —O— or —NH—, K is 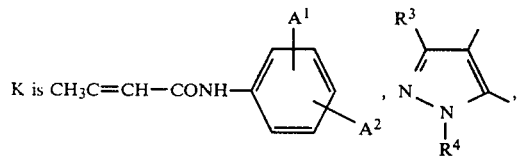

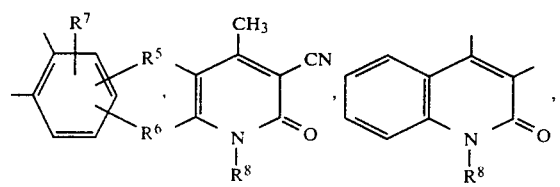

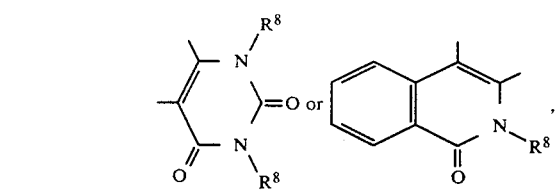

$R^3$ is hydrogen, methyl, phenyl, carbonyl or carbamyl, $R^4$ is hydrogen, or phenyl which is unsubstituted or substituted by methyl, chlorine or hydroxysulfonyl, $R^5$ is methyl, methoxy, acetylamino, propionylamino, benzoylamino, N-phenylamino, dimethylamino or diethylamino, $R^6$ is hydrogen or methyl, $R^7$ is hydrogen or, when $R^5$ and $R^6$ together are a fused benzene ring which is unsubstituted or substituted by bromine, amino, hydroxyl, phenylamino, acetylamino, propionylamino, benzoylamino or hydroxysulfonyl, is hydroxysulfonyl, $R^8$ is hydrogen, unsubstituted or substituted $C_1$-$C_{18}$-alkyl, benzyl or phenylethylene, wherein $Z^1$, $Z^2$, Z, X, Y and K have the meaning stated hereinabove.

3. A compound as claimed in claim 1, of the formula

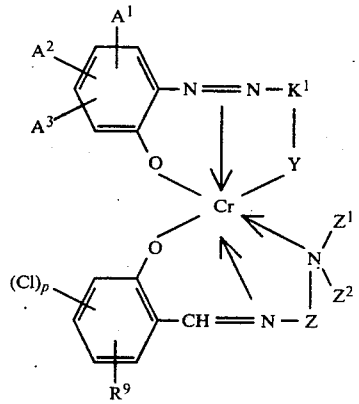

Ib where p is 0, 1 or 2, $R^9$ is hydrogen or, where p=O, $R^9$ is phenylazo which is unsubstituted or substituted by chlorine, methyl, methoxy or hydroxysulfonyl, $K^1$ is a radical of the formula

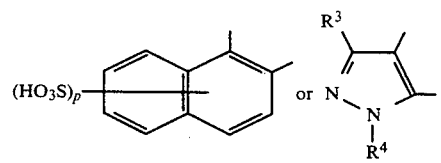

and $A^1$, $A^2$, $A^3$, Y, Z, $Z^1$, $Z^2$, $R^3$ and $R^4$ have the above meanings.

4. A compound as claimed in claim 1, of the formula

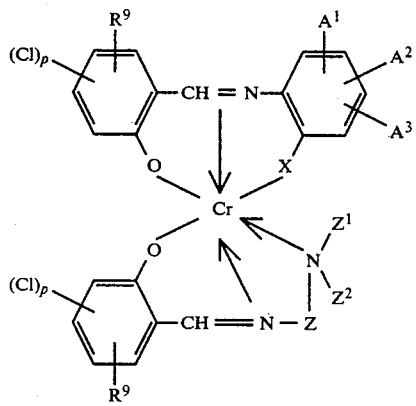

where $A^1$, $A^2$, $A^3$, p, $R^9$, X, Z, $Z^1$ and $Z^2$ have the meanings given for formula Ib.

* * * * *